United States Patent Office 3,842,141
Patented Oct. 15, 1974

3,842,141
SILICONE-EPOXY COPOLYMERS AND MOLDING POWDERS OBTAINED THEREFROM
Charles A. Fetscher, Olean, and John J. Sparapany, Allegany, N.Y., assignors to The Dexter Corporation, Windsor Locks, Conn.
No Drawing. Continuation of abandoned application Ser. No. 228,236, Feb. 22, 1972. This application Jan. 31, 1973, Ser. No. 326,174
Int. Cl. C08g 45/16, 47/10
U.S. Cl. 260—824 EP
17 Claims

ABSTRACT OF THE DISCLOSURE

Heat curable molding and/or coating powders having significantly improved volume resistivity and electrical insulating properties and significantly reduced water absorptioin are provided through the novel silicone-epoxy resin copolymers of the invention. These copolymers, produced in powdered form, are obtained through the reaction of a hypdroxy functional methyl phenyl silicone intermediate and an epoxy resin having at least one hydroxyl group and a molecular weight of at least 624.

In preferred embodiments, the silicone has an average molecular weight of from about 1400 to 1600, is present on a weight percent basis in an amount of from about 25% to 35% and the amount present is no greater than that required to have its hydroxyl groups which are reactive at 120° C. react with the hydroxyls supplied by the epoxy resin.

This application is a continuation of prior application Ser. No. 228,236 filed Feb. 22, 1972 now abandoned.

This invention relates to novel silicone-epoxy resin copolymers which, when employed in molding and/or coating powders, exhibit significantly improved electrical insulating properties, significantly reduced water and moisture absorpiton, and retention of high volume resistivity during periods of prolonged pressure cooking. This invention also relates to a method for obtaining the novel silicone-epoxy resin copolymers.

BACKGROUND OF THE INVENTION

It is known that phenyl containing, hydroxyl terminated, silicone polymers are not only capable of self-condensation, but can also be made to react with organic alcohols. Consequently, it appeared possible to incorporate silicone segments into various organic polymer systems, such as alkyds, in place of some of the acids normally used in such formulations. Thus, from silicone-modified alkyds there have been obtained coatings having enhanced weather resistance and increased outdoor durability.

It also appeared that these silicone prepolymers were capable of being condensed with hydroxyl-containing epoxy resins, such as Bisphenol A resins having equivalent weights above about 325, higher molecular weight cycloaliphatic resins containing hydroxyl groups, and the like. However, the hydroxyls in these resins are secondary alcohols and are, therefore, much less reactive than the alcohol groups present in the alkyd systems. Consequently, the competing reaction of self-condensation of the silicone resin is of primary importance when the desired reaction is that of the silicone with a secondary alcohol rather than with a primary alcohol.

The prior art is replete with disclosures revealing the use of silicons and silanols; that is, silicones having at least one hydroxyl group, with epoxy resins, including epoxy resins having hydroxyl groups.

Illustrative of such prior art disclosures are U.S. Pats. 2,687,396 and 2,678,398 both to McLean, 2,730,532 to Martin; 2,768,150 to Millar et al.; 2,819,245 to Schorr; 2,883,395 to Rogers et al.; 2,997,458 to Lewis; 3,055,858 to Frye et al.; 3,120,564 to Milionis et al.; 3,154,597 to McWhorter; 3,170,890 to Boyd et al.; 3,170,962 to Tyler; 3,200,031 to Rittenhouse; 3,247,280 to Kanner; 3,299,166 to Emblem et al.; and 3,317,443 to Brady.

Of these exemplary references, only a few are of sufficient interest to warrant further comment. U.S. Pat. 2,768,150 to Millar et al., for example, discloses a product obtained from the reaction of a silanol and a polyol with an acidic component and an epoxy wherein the last component is merely mixed in the batch in order to avoid reaction of these components with the silanol and polyol. To assure a reaction does not occur, the mixing is accomplished without the application of heat.

U.S. Pat. 2,819,245 to Schorr discloses a product obtained from the reaction of epoxy resins with a silicone containing a group, other than hydroxyl, functionally reactive with epoxy resins. The silicon-oxygen-carbon linkage (—Si—O—C—) is negated as this linkage is considered to be extremely sensitive to hydrolysis and less resistant to water than the epoxy resin employed. This, of course, is true since the —Si—O—C— linkage, at least in non-polymeric materials. is very sensitive to hydrolysis. The Union Carbide Silicones Division Customers Service Bulletin (CSB 15–15, December 1966, page 6) describes the reaction of water with nine of their commercial silanes. This aspect has been further developed by Meals and Lewis in Silicones, p. 243 (1959, reprinted 1961) and in the Handbook of Epoxy Resins by Lee and Neville, pp. 2–22 (1967).

In U.S. Pat. 3,170,962 to Tyler there are disclosed epoxy resin-silicone solution products which can contain from 1% to 99% by weight of either component and which products are used in solution form as coatings. With this range of amounts, it is evident that mere traces of one component will not improve the performance of the other to any significant degree. Obviously, there is no concern in this teaching with stoichiometric quantities of the silicone and/or epoxy resin, nor a specific reaction involving at least most of the silicone and most of the epoxy to provide a homogeneous product, for the product obtained is described as being self-curable without a curing agent in less than one hour at 150° C.

Finally, U.S. Pat. 2,730,532 discloses the reaction product of alcohols containing at least one epoxy group with silicone compounds containing an acidic OH group attached to a silicon atom. This patent is noteworthy as it appears to utilize, with non-polymeric epoxides and silicones, the same basic chemistry that has now been found to be useful with polymeric materials; that is, it suggests the importance of stoichiometric proportions or reagents which has been heretofore ignored in prior attempts to obtain useful silicone-epoxy composites. The relevancy of this factor to the process of this invention will become more apparent hereinafter.

It can be seen that these illustrative prior art disclosures are directed primarily toward coating compositions and the products obtained are provided in the form of solutions. None of these references, as well as many other which have been analyzed but not mentioned here, reveal a solid, homogeneous silicone-modified epoxy resin copolymer obtained by condensing an epoxy resin and a polyhydroxy silicone prepolymer. Furthermore, none of these references reveal that the products which they disclose contain improvements over the properties exhibited by similar products obtained from unmodified epoxy resins. Finally, there is no silicone-epoxy copolymer suitable for molding and which is available as a solid.

THE INVENTION

It has now been found that molding and/or coating powders having improved electrical insulating properties, reduced moisture absorption, and retention of high volume resistivity during periods of prolonged pressure cooking can be obtained utilizing the silicone-epoxy resin copolymer of this inventon. This solid copolymer generally comprises the reaction product of a hydroxy functional methyl phenyl silicone intermediate and an epoxy resin having at least one hydroxyl group and a molecular weight of at least about 624, the molar ratio of epoxy resin to silicone being preferably about 4.0:1. Under this criteria, the epoxy resin supplies the absolute minimum number of hydroxyl groups needed to react with all of the reactive hydroxyl groups of the silicone intermediate. Hence, it is preferred that the epoxy resin employed provide an excess of these organic hydroxyl groups to insure complete reaction with the reactive silicone hydroxyls.

Other than the above criteria, the epoxy resins wh'ch can be employed are not critical and such commercially available resins as Bisphenol A resins and some cycloaliphatic resins can be utilized, but such resins as epoxidized novolacs are inoperable.

A practical, operable range of epoxy resin in the composite of the invention is one where the epoxy resin has a molecular weight of about 700 to 2000 and about 4 to 6 mols of this resin per mol of the silicone are employed. As noted above, the epoxy resin should be present in an amount sufficient to react with all of the reactive hydroxyl groups supplied by the silicone and the larger number of epoxy resin molecules should be used when its molecu'ar weight is at the lower end of the molecular weight range. Mixtures of epoxy resins can also be utilized but, such mixtures do not significantly nor materially contribute to the silicone-epoxy resin copolymer.

Preferably, the epoxy resins employed should be those having a molecular weight of about 800 to 1200 so that the molar ratio of epoxy resin to silicone can preferably be about 4.25:1 to 4.75:1. Within these ranges, the copolymer will contain about 25% to 33% by weight silicone. However, under the broader ranges of molecular weight and molar ratios described above, a copolymer containing as much as 40% by weight silicone or as little as 15% by weight silicone will exhibit improved properties in a molding or coating composition as compared with similar systems utilizing unmodified epoxy resins.

Although the use of an epoxy resin having a molecular weight no higher than about 2000 has been indicated, it should be understood that this limitation reflects a consideration of the economics involved in commercial production of the copolymer. In effect, there is no upper molecular weight limit in considering the epoxy resin to be employed other than the considerations dictated by the practicalities involved in obtaining the copolymer of the invention and/or the degree of performance desired or required to be obtained when utilizing the copolymer. Consequently, the use of epoxy resins having molecular weight (M.W.) in excess of 2000 is possible. However, it should be borne in mind, and will be apparent to those skilled in the art, that an increase in the epoxy resin M.W. will result in using more epoxy resin thereby correspondingly decreasing the amount of silicone in the copolymer, and a reduction of the silicone content in the copolymer will result in diminishing the improved properties of the copolymer. As noted earlier, however, copolymers containing as little as about 15% by weight silicone are useful.

The silicone employed to obtain the copolymer is preferably a hydroxy terminated tetrafunctional intermediate having an average M.W. of about 1400 to 1600. However, hydroxyl functional silicones having a functionality of 2, 3 or 5 and lower or higher molecular weights can also be employed, provided an excess of hydroxyl groups is provided by the epoxy resin. This, in turn, would permit a useful copolymer to be obtained wherein the silicone content is in excess of 40% by weight.

In general terms the useful silicones can be represented by the formula:

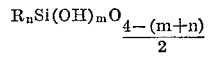

wherein R is selected from the group consisting of $C_1$ to $C_4$ alkyl, phenyl, methyl phenyl and chlorophenyl radicals, with at least about half of said radicals being aromatic radicals, "$n$" has an average value from 0.9 to 3.0, "$m$" has an average value from 0.5 to 3.1, and the sum of $n+m$ is not greater than 4.

A typical silicone might have the theoretical formula $(H_6H_5)_{10}(CH_3)_6Si_{14}O_{18}(OH)_4$, but due to difficulty in removing water from SiOH groups during preparation, the material may fall somewhere between the above theoretical formula and the formula:

$$(C_6H_5)_{10}(HC_3)_6Si_{14}O_{17}(OH)_6$$

Since the silicones employed are intermediate prepolymer products, details of their structure have not been made available by their producers and their selection for use in the copolymers of the invention is dictated by their availability. At present, useful commercial silicone intermediates can be obtained under Dow Corning's product designation "Z-6018" and Union Carbide's product designation "X-850." The "Z-6018" product is provided as a powder while the "X-850" product is provided in solution form and some of the more important physical properties of these products are tabulated below:

| Typical physical properties | Product | |
| --- | --- | --- |
| | "X-850" | "Z-6018" |
| Total solids | 75±1.0% | 98% min. (ASTM D 1346). |
| Solvent | Butyl acetate | None. |
| Hydroxyl content | 4.5% | 5.5% condensable, 0.5% free (Dean Stark). |
| Average M.W. | 1,400 | 1,600. |
| Average combining weight | 360 | 400. |
| Refractive index | | 1.531 to 1.539. |
| Softening point | | 200° F. (Durran's Mercury Method). |
| Viscosity (77° F.) | 300-800 (Brookfield). | 33 cps.[1] |
| | | A-1 (Gardner Holdt).[1] |
| Specific gravity (77° F.) | 1.09 | 1.075.[1] |
| Color, Gardner | <1 | 1 max.[1] |

[1] As 60% solids in xylene.

In addition to the foregoing tabulation, the present suppliers of these silicone intermediates have indicated that the hydroxyl content of these silanes can vary within the range of about 4.5 to 7.0%. It has been found, however, that the proper stoichiometry to be utilized in obtaining the copolymers of this invention is not based on the hydroxyl content of the silicone intermediate, but on the number of reactive hydroxyls present in them, and this factor is of primary importance.

Not all of the hydroxyl groups of these hydroxyl functional silicones are reactive under the processing conditions utilized to obtain the copolymer of this invention. This is a surprising phenomenon and is considered to be unique to this type of material. More specifically, it has been found that no matter how many OH groups are revealed by analysis of the silicone intermediate or how much epoxy hydroxyl is available, the number of epoxy molecules that will combine with the silicone intermediate is no greater than the number of reactive OH groups in the silicone intermediate, and under proper processing conditions, no homopolymerization is observed.

The reasons for this limited reactivity when the silicone intermediate reveals a greater hydroxyl content is not completely understood but it is believed to be due to the complex structure of the silicone intermediate wherein some form of stearic hinderance occurs; that is, the position of some of the OH groups in the molecule prevents them from reacting with the epoxy OH groups, This unusual stoichiometric relationship was repeatedly tested utilizing the "Z-6108" silicone identified in the Table on page 8. These tests constantly revealed that in the reaction of "Z-6018," which contains about 4.7 to 6.6 hydroxyl groups, only four of the silanol hydroxyls reacted at a temperature below about 120° C., the preferred copolymerization temperature in the process of this invention. Since the epoxy resin utilized in this invention contains at least one OH group, this unusual reactivity was also compared with simpler organic alcohols in place of the hydroxyl containing epoxy. For example, when the silicone intermediate was reacted with a secondary alcohol, such as methyl isobutyl carbinol, the reaction rate was extremely slow with the silanol at 120° C. A primary alcohol, such as normal decanol, although found to be reactive, reacted at a much slower rate than any of the operable epoxy resins. A comparison of the reaction rates, and yields of these typical primary and secondary alcohols and the OH containing epoxy with the silicone intermediate is listed below where 100% represents 4 mols of by product water, or the reaction of 4 silanol hydroxyl groups.

| Alcohol | Time at 120° | Yield percent |
|---|---|---|
| Hydroxyl containing epoxy | 3 to 6 hrs | 80–100 |
| Methyl isobutyl carbinol | 16 hrs | 13.6 |
| N decanol | 12 hrs | 68 |

As noted earlier, an excess of epoxy is tolerable and a small epoxy excess is preferred to assure that sufficient epoxy is present, as a deficiency of epoxy would result in a useless product. On the other hand, a large epoxy excess, such as to react with 7 indicated hydroxyls in some silicone intermediates when only 4 of its hydroxyl groups are reactive, would seriously dilute the silicone content of the copolymer and detract from its desired performance.

In general, the process of the invention comprises dissolving the silicone intermediate with the necessary amount of epoxy resin in a suitable solvent such as toluene; heating the charge to azeotrope of water formed from condensation of the epoxy resin and silicone; distilling off the solvent; and, permitting the molten resin to cool and solidify to obtain the silicone-epoxy resin copolymer of the invention. The cooled copolymer can then be ground to a particulate size desired or required for subsequent blending and combining with other ingredients to obtain a powdered, heat-curable molding or coating composition.

In the above-described process, distillation of the solvent can be aided by reducing the pressure and it is preferred to run the reaction under an inert atmosphere with good agitation. It is also preferred that the silicone be added to the initial charge in a step-wise fashion, each step-wise addition of the silicone being followed by reheating of the charge. To consistently and dependably achieve optimum results, the silicone should be divided into equal portions, including the initial combining amount, and each aliquot thereafter added step-wise to the charge as described above.

It is also important that reaction temperatures be maintained within appropriate limits for at temperatures below about 110° C., the reaction proceeds very slowly while at temperatures higher than about 120° C., undesirable silicone homopolymerization occurs. When the reaction is complete it is indicated by the fact that no more water is being evolved, the heat stable product has formed, and the temperature can then be increased as necessary to remove the last of the solvent. Self-condensation can be minimized by maintaining an excess of epoxy hydroxyl throughout the reaction, and the water should also be removed as quickly as possible to minimize regeneration of the silanol. At the end of the reaction, the temperature is raised to 140–150° C., preferably under vacuum, to remove the last of the solvent. Since residual silanol hydroxyl is most probably present, this high temperature interval should be as short as possible.

As previously indicated, the copolymer of the invention in solid particulate form can be blended and/or combined with conventional ingredients to provide heat-curable molding and/or coating powders, such as those utilized to encapsulate electronic devices. When providing such powders, the copolymer of the invention can be substituted for all or only a part of the conventional, unmodified epoxy resin employed. In addition to the copolymer of the invention and any unmodified epoxy resin employed, typical molding and/or coating powders generally include the following ingredients at the indicated ranges of amounts:

Typical Ingredients for Molding and/or Coating Compositions

| Ingredient: | Range of Amounts (% by weight) |
|---|---|
| Curing agents | 2.5–20.0 |
| Mold release agents | 0.25–2.0 |
| Pigments | 0.0–0.5 |
| Fillers | 25.0–65.0 |
| Catalysts | 0.2–1.5 |

It should be understood that the ranges indicated above are not fixed but are intended to be representative and can, therefore, be included in lessor or greater amounts than those shown.

Illustrative of the curing agents which can be utilized in such compositions are benzophene tetracarboxylic acid dianhydride (BPDA), phenolic novolacs, tetrachlorophthalic anhydride, methylene bis resorcinol (methylene bis-2,4-hydroxy-benzene), and other typical anhydrides and phenolics.

Similarly, typical mold release agents include calcium stearate, glycerol monostearate, and the like, as well as commercial waxes such as those available under the Trademarks "Chemetron Wax 100," "Ross Wax," "Ross Wax 141," a lignite wax commercially available as "Montan," and the like.

Conventional pigments such as titanium dioxide, carbon black, and the like can be employed as well as fillers, such as chopped glass fibers, powdered silica, alumina, hydrated alumina, powdered barium sulfate, talcs, clays, graphite, and the like.

Exemplary of the catalysts which can be used are triphenyl phosphine, imidazole, 2-heptadecyl imidazole, 2-methyl imidazole, tertiary and quaternary amines, and the like.

In deriving the silicone-epoxy resin copolymers of the invention, the teachings disclosed in the previously mentioned patent to Tyler (3,170,962) were fully examined. Silicone in amounts of about 5% to 10% by weight were combined with epoxy resins but the resultant products did not exhibit any improved properties or performance when utilized in conventional coating compositions. It was further found that a homogeneous, solid copolymer could not be obtained when an excess of silicone was present above the amount required to react with the hydroxyl groups supplied by the epoxy resin.

It will also be recalled that the patent to Schorr (2,819,245) reveals that the Si—O—C linkage is inherently very hydrolytically unstable.

In view of these factors, it is of paramount significance that the silicone-epoxy resin copolymers of the invention, which contain the Si—O—C linkage, exhibit premium water resistance and are obtained as solid, homogeneous copolymers which can be utilized in molding powders to provide improved electrical insulating properties.

Various aspects of the invention will be more fully appreciated when considered together with the following examples which are set forth to further illustrate the invention and are not in any way intended to be, nor should they be construed as being, limitative of the invention. Unless indicated otherwise, all parts and percentages in the Examples are by weight. Examples 1–11 which follow are set forth to demonstrate preferred embodiments for preparing the silicone-epoxy copolymers, Examples 12–26 reveal molding powders obtained therefrom, and the remaining Examples illustrate typical results obtained with molding powders containing the copolymers of the invention.

In the Examples, the results shown for the "150° C. heat cycle test" were obtained as follows:

Ten grams of the silicone-epoxy resin copolymer obtained were heated in an aluminum dish at a temperature of 150° C. for a period of one hour after which the copolymer was allowed to cool and the solidified resin broken up. The heating and cooling steps are repeated twice more for a total of three hours of heating. A well made, solid copolymer should have a uniform appearance, will melt completely after the first and second heating steps and should have essentially the same uniform appearance after three hours of heating as it does after the first hour of heating. An unsatisfactory copolymer will not melt completely after the first heating and will contain lumps of infusible silicone in the fluid epoxy resin. Results are given as "passed" or "failed" with regard to the above described 150° C. heat cycle test.

In the Examples the molar quantities shown are relative and are given merely to reveal the molar ratios used.

EXAMPLE 1

A total of 26.10 lbs. (4.25 mols) of an epoxy resin, available from Shell Chemical Co. under the Trademark "Epon 1001," and having an epoxy equivalent weight (E.E.W.) of 425–550 and a Durran's softening point (S.P.) of 65°–75° C. was used. All of the epoxy resin (26.10 lbs.), 14.33 lbs. toluene, and one half of 10.60 lbs. (5.30 lbs.) of a tetra functional, hydroxy terminated silicone intermediate having an average molecular weight (Av. M.W.) of about 1600, a refractive index (R.I.) of 0.531–1.539, and an S.P. (Durran's mercury method) of 200° F., and commercially available under the Trademark "Dow Corning Z–6018 Intermediate" were charged to a 15 gallon capacity reactor equipped with a stirrer, thermo-couple, $N_2$ blanket, condenser, collector and vacuum take-off. The charge was heated with constant stirring until it went into solution with toluene being distilled off during heating. Heating of the charge and distillation of the toluene was continued until the charge reached a temperature of 265° F. after which the charge was cooled to 200° F. The distilled toluene was then added back to the charge together with 3/10 (3.20 lbs.) of the silicone intermediate, the charge was heated and toluene distilled until the charge again reached a temperature of 265° F. Once again the charge was cooled to 200° F. and the distilled toluene plus the remaining 2/10 (2.10 lbs.) silicone intermediate were added to the charge followed by heating and distillation of toluene until the charge reached a temperature of 265° F. At this temperature, the charge was placed under vacuum until the remainder of the toluene was removed. The charge was first transferred to a 5 gallon capacity container before placing aliquots of the charge in stainless steel trays in which it was permitted to stand and cool to room temperature. Upon cooling, the resultant opaque, solid product had a light grayish-green color, was found to be readily sinterable at about 80° F., passed the 150° C. heat cycle test, and had an S.P. (Durran's) of 62°–64° C. and an E.E.W. of 642. The product was ground through a No. 5 screen on a Brabender grinder and then packaged in particulate form in two 5 gallon containers.

The copolymer obtained from this Example was found to be quite stable. When reanalyzed after storage for a period of nine months at room temperature, it was found that the E.E.W. of this product had not changed. This reveals that the copolymers of the invention are stable and do not self-cure under ordinary conditions.

EXAMPLE 2

In this Example, the epoxy resin used was obtained from Celanese Corp. under the Trademark "Epi-Rez 519." It had an E.E.W. of about 390–450 and an S.P. (Durran's) of about 60°–70° C. while the silicone employed was the same as that identified in Example 1.

Prior to preparing the product according to the following procedure, which was run in duplicate, one half of the total of 480 g. (1.0 mol) of the silicone was first dissolved in 225 g. toluene in a beaker with stirring at room temperature and identified as "S," and then used where and as indicated below. The amount of toluene used was 20% of the total amount of toluene (1125 g.) employed in this Example.

At room temperature, 1025 g. (4.25 mols) of the epoxy resin, 900 g. toluene and the remainder of the silicone (240 g.) were placed in a 4 liter resin kettle equipped with a pot thermometer, reflux condenser, stirrer, Barrett trap, and $N_2$ blanket. The charge was then heated until all solids were dissolved and heating was continued at reflux for a period of one hour during which 18 mls. $H_2O$ were recovered, 9 mls. $H_2O$ from each run. The charge was then cooled to a temperature of 100° C. at which time one-half "S" was added and the charge again heated to reflux and held for one hour during which 8.5 mls. $H_2O$ were recovered, 4.5 mls. $H_2O$ from the first run and 4.0 mls. from the second run. The charge was then left standing overnight after which the remainder of "S" was added to it. The charge was then heated at reflux for one hour, and 4.5 mls. and 5.0 mls. $H_2O$ were respectively recovered from the runs bringing to 18 mls. the total amount of $H_2O$ recovered from each of the runs. (Theoretical $H_2O$ recovery: 21.6 mls.) Next, the charge was cooled and toluene was taken off by distillation at 1 atom. until the charge reached a temperature of 140° C. At this time, the charge was placed under vacuum to remove final traces of toluene until it reached a maximum temperature of 160° C. The amount of toluene recovered was 1105 mls. from the first run and 1075 mls. from the second run.

The resultant viscous, opaque product from each run was placed on a foil tray and allowed to cool to room temperature whereupon it was found to have an S.P. (Durran's mercury method) of 65°–67° C. and E.E.W. of 577, and passed the 150° C. heat cycle test. The products from each run were then ground through a No. 6 screen on a Brabender grinder, blended together and packaged in a bag.

EXAMPLE 3

The same procedure of Example 2 was employed utilizing 480 g. (1.0 mol) of the same silicone, a total of 1400 mls. toluene, and 1294 g. (4.25 mols) of the same epoxy resin as in Example 1.

The product obtained in the same manner as in Example 2 was a white, grindable solid having an S.P. (Durran's mercury method) of 62°–64° C., an E.E.W. of about 660, and passed the 150° C. heat cycle test.

EXAMPLE 4

The procedure of Example 2 was again followed utilizing 480 g. (1.0 mol) of the same silicone and a total of 1488 mls. toluene. In this Example, 1342 g. (4.25 mols) of an epoxy resin available from Dow Chemical Corp. under the Trademark "DER–661" was used having an E.E.W. of 475–575 and, an S.P. (Durran's) of 70°–80° C.

The product obtained as in Example 2 was also a white grindable solid having an S.P. (Durran's mercury method) of 65°–67° C., an E.E.W. of about 694, and passed the 150° C. heat cycle test.

EXAMPLE 5

The procedure of Example 2 was followed again utilizing 400 g. (1.0 mol) of the silicone of Example 2, a total of 1,000 g. toluene, and 936 g. (4.25 mols) of an epoxy resin having an S.P. (Durran's mercury method) of 45°–47° C., and an E.E.W. of 452.

The epoxy resin employed in this Example was obtained by condensing 2.0 mols of the diglycidyl ether of Bisphenol A with 1.0 mol of Bisphenol A according to the following method, the diglycidyl ether of Bisphenol A being obtained from Celanese Corp. under the Trademark "Epi-Rez 508" and is essentially a liquid epoxy resin having an E.E.W. of 175 and a Gardner viscosity of 4000 cps.

To a resin kettle equipped with stirrer, pot thermometer, condenser and $N_2$ blanket, there was first charged 708 g. (2 mols) of the diglycidyl ether of Bisphenol A (Epi-Rez 508) which was warmed to about 50° C. Triphenyl phosphine as catalyst in an amount of 1.5 g. was then added and mixed well followed by addition of 228 g. (1 mol) powdered Bisphenol A which was also well mixed while the temperature of the entire charge was raised at a rate of about 2° C. per minute. When the temperature reached 150° C., a mild exotherm took place which raised the temperature of the charge to about 165° C. without externally increasing the application of heat. The charge was then allowed to cool to a temperature of 150° C. where it was held for a period of one hour and then allowed to cool to 140° C. at which time the charge was transferred to a foil tray and allowed to cool and solidify. The epoxy resin obtained was a pale brown, grindable solid having an S.P. of 67°–69° C. and an E.E.W. of 510.

As noted earlier, this resin was utilized to obtain the silicone-epoxy resin copolymer of the invention in accordance with the procedure of Example 2 and there was obtained a white, grindable solid having an S.P. (Durran's mercury method) of 49°–51° C., and an E.E.W. of 613, and which passed the 150° C. heat cycle test.

EXAMPLE 6

Once more the procedure of Example 2 was utilized employing the same silicone of Example 2 in an amount of 480 g. (1.0 mol) and toluene in an amount of 1290 ml. The epoxy resin employed was a cycloaliphatic epoxy resin, commercially available from Union Carbide Corp. under their Trademark "ERRA–4211," in an amount of 996 g. (4.0 mols) and having an E.E.W. of 415. This epoxy resin is further described in the available literature as having the following structure:

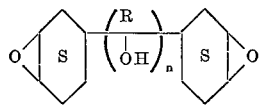

wherein "S" denotes that the rings are saturated while "$n$" and "R" are not identified.

The nature of the above structure, however, suggests that there is present at least one, and probably several, hydroxyl groups per molecule. Consequently, the ratio of epoxy resin:silicone in this Example was reduced from 4.25:1 to 4.0:1.

Following the procedure of Example 2, there was obtained a brown, solid, grindable product which passed the 150° C. heat cycle test and had an S.P. (Durran's mercury method) of 70°–75° C. and an E.E.W. of about 552.

The product obtained in this Example indicates that cycloaliphatic epoxy resins can be readily utilized to obtain the composites of the invention.

EXAMPLE 7

Again, the procedure of Example 2 was followed to obtain a copolymer from 4500 ml. of toluene, 1600 g. of the same silicone identified in Example 1, and 3175 g. (4.5 mols) of an epoxy resin having an E.E.W. of about 355 and a Durran's S.P. of about 40–45° C. and obtained under the Shell Chemical Co. Trademark, "Epon 840."

The product obtained was a white, grindable solid which passed the 150° C. heat cycle test and had an S.P. (Durran's) of 60° C. and an E.E.W. of 531. This product was found to block within a few hours and was, therefore, stored under refrigeration.

EXAMPLE 8

Utilizing the procedure of Example 2 once more, a copolymer was obtained from 640 g. toluene, 840 g. (4.5 mols) of the same epoxy resin as in Example 1, and 386.6 g. (1 mol) of the Union Carbide silicone intermediate product "X–850" as identified hereinabove. There was recovered a total of 9 cc. water and 740 cc. solvent. The viscous, yellow liquid obtained at 155° C. became a smooth grindable solid at room temperature having an S.P. (Durran's) of about 68°–70° C. and an E.E.W. of about 629, and which passed the 150° C. heat cycle test.

EXAMPLE 9

The same procedure was followed as in Example 2 utilizing 4500 g. (4.5 mols) of the epoxy resin of Example 1, 1600 g. (1 mol) of the silicone of Example 1, and 2000 mls. toluene to obtain a product having an S.P. (Durran's) of about 65° to 67° C. and an E.E.W. of about 609, and which passed the 150° C. heat cycle test.

EXAMPLE 10

Following the procedure of Example 2, 2200 mls. toluene, 4800 g. (4.8 mols) of the epoxy resin of Example 1, and 1600 g. (1 mol) of the silicone of Example 1 were utilized to obtain a product having an S.P. (Durran's) of about 63°–65° C. and an E.E.W. of 655, and which passed the 150° C. heat cycle test.

EXAMPLE 11

Again following the procedure of Example 2, 3575 g. of an epoxy resin (4.04 mols) having an S.P. (Durran's) of about 57° C. and an E.E.W. of about 440 available from Dow Chemical Co. under the Trademark "XD–3606" was utilized with 1600 g. (1 mol) of the silicone of Example 1 and 2000 mls. toluene to obtain a yellow grindable product having an S.P. (Durran's) of about 70° C. and an E.E.W. of about 630, and which passed the 150° C. heat cycle test.

Utilizing the products obtained in Examples 1–11 above, several molding powders were prepared and the general methods of their preparation, the ingredients comprising these powders, and their more significant chemical and physical properties are set forth in the Examples which follow. In these Examples, the particle size of the silicas used as fillers were 100% through 60 mesh and 80% through 80 mesh sieves. Where indicated, the properties of "hot strength," "release," and "appearance" were determined by subjective analysis.

EXAMPLE 12

The silicone-epoxy resin copolymer of Example 2 was used to obtain a molding powder having the following formulation ingredients at the indicated amounts:

| Formulation ingredients: | Amount (grams) |
|---|---|
| Silicone-epoxy copolymer of Example 2 | 27.60 |
| Curing agent: | |
|     Benzophenone-dianhydride (BPDA) | 6.40 |
| Mold release agents: | |
|     Chemetron Wax 100 | 1.50 |
|     Montan Lignite Wax | 0.30 |
| Pigment: | |
|     Carbon black | 0.40 |
| Fillers: | |
|     ⅛" chopped glass fiber | 3.00 |
|     Powdered silica | 59.55 |
| Catalyst: | |
|     10 parts triphenyl phosphine thoroughly mixed with 30 micron silica powder | 1.25 |
| | 100.00 |

A molding powder was obtained from the above formulation by milling it four laps on a two roll mill and then grinding the resultant product to a powder capable of passing through an eight mesh screen. During milling, the front roll was at a temperature of about 140° to 160° F. and the back roll was at a temperature of about 70° to 90° F. The powder obtained exhibited good hot strength, release and appearance when cured in 1.5 minutes at a temperature of 350° F. The product also had the following properties:

Gel time (at 320° F.) _____seconds__ 31
Spiral flow (at 300° F.) _____inches__ 26
Spiral flow (at 350° F.) _____do____ 36.5

EXAMPLE 13

The silicone-epoxy resin copolymer of Example 2 was again used to obtain a molding powder by first preparing a hot melt combination. The hot melt combination was obtained by separately melting at 135° C., 90.5 parts of the Example 2 product and 9.5 parts methylene bis resorcinol (methylene bis 2,4-hydroxy benzene) as curing agent, combining and then thoroughly mixing these ingredients. The resultant mix was then permitted to cool and solidify on a foil tray after which the solid product was ground to a powder capable of passing through an eight mesh screen. This hot melt combination powder was then used to obtain a molding powder from the following formulation:

Formulation ingredients:          Amount (grams)
  Hot melt combination powder _____ 30.00
  Mold release agent:
    "Ross Wax 141" _____ 0.50
  Pigment:
    Carbon black _____ 0.40
  Fillers:
    1/32" chopped glass fiber _____ 5.00
    Powdered silica _____ 63.00
  Catalyst:
    2-heptadecyl imidazole _____ 1.10
                                            _____
                                            100.00

A molding powder was obtained from the above formulation as in Example 12, and it exhibited fair hot strength, good release and appearance, cured in 2.5 minutes at 350° F. and also had the following properties:

Gel time (at 320° F.) _____seconds__ 35
Spiral flow (at 350° F.) _____inches__ 33

EXAMPLE 14

Utilizing the silicone-epoxy resin copolymer of Example 1, a molding powder was obtained from the following formulation:

Formulation ingredients:          Amount (grams)
  Silicone-epoxy copolymer of Example 1 _____ 25.70
    Curing agent:
      Phenolic novolac (m.p. 90°–95° F.) ___ 4.30
    Mold release agent:
      "Ross Wax 141" _____ 0.50
    Pigment:
      Carbon black _____ 0.40
    Fillers:
      1/32" chopped glass fiber _____ 5.00
      Silica _____ 63.00
    Catalyst:
      2-heptadecyl imidazole _____ 1.10
                                            _____
                                            100.00

A molding powder was obtained from the above formulation as in Example 12 and it exhibited good hot strength, release and appearance, cured in 2.0 minutes at 350° F., and also had the following properties:

Gel time (at 320° F.) _____seconds__ 42
Spiral flow (at 350° F.) _____inches__ 56

EXAMPLE 15

To obtain the following molding powder, the silicone-epoxy resin copolymer of Example 4 was utilized and 80% by weight of the epoxy resin content of the molding powder was supplied by the epoxy resin of Example 4 while the remaining 20% by weight was a tetrafunctional glycidyl ether of a tetraphenolic compound having an E.E.W. of 220 an S.P. of about 77° C. and commercially available from Union Carbide Corporation under the Trademark "ERRA–0153." A molding powder was obtained from the following formulation:

Formulation ingredients:          Amount (grams)
  Silicone-epoxy resin copolymer of Example 4 _____ 21.60
  ERRA–0153 _____ 5.15
  Curing agent:
    Tetrachlorophthalic anhydride _____ 11.15
  Mold release agents:
    Calcium stearate _____ 1.50
    Glycerol monstearate _____ 0.75
  Pigment:
    Carbon black _____ 0.40
  Fillers:
    1/4" chopped glass fiber _____ 10.00
    Powdered Silica _____ 48.45
  Catalyst:
    2-methyl imidazole _____ 1.00
                                            _____
                                            100.00

A molding powder was obtained from the above formulation as in Example 12 and it exhibited good hot strength, release and appearance, cured in 2.0 minutes at 300° F., and also had the following properties:

Gel time (at 320° F.) _____seconds__ 26
Spiral flow (at 300° F.) _____inches__ 58

EXAMPLE 15A

For comparative purposes, a molding powder was prepared from a formulation utilizing the same ingredients as in Example 15 above except that the epoxy resin employed was not modified with silicone. Hence, the epoxy resin content of the molding powder obtained comprised 5.15 grams of the ERRA–0153 resin shown in the formulation of Example 14 and 21.60 grams of the DER–661 resin of Example 4.

EXAMPLE 16

A molding powder was obtained, utilizing the silicone-epoxy resin copolymer of Example 4, from the following formulation:

Formulation ingredients:          Amount (grams)
  Silicone-epoxy copolymer of Example 4 ____ 28.60
    Curing agent:
      BPDA _____ 5.40
    Mold release agents:
      "Chemetron Wax 100" _____ 1.50
      Montan lignite wax _____ 0.30
    Pigment:
      Carbon black _____ 0.40
    Fillers:
      1/4" chopped glass fiber _____ 3.00
      Powdered silica _____ 59.55
    Catalyst:
      (Same as in Example 12) _____ 1.25
                                            _____
                                            100.00

The molding powder from the above formulation was obtained in the same manner as in Example 12 and it exhibited fair hot strength, release and appearance, cured in 2.0 minutes at 350° F., and also had the following properties:

Gel time (at 320° F.) _____seconds__ 26
Spiral flow (at 300° F.) _____inches__ 16

EXAMPLE 17

A hot melt combination powder was prepared utilizing the silicone-epoxy resin copolymer of Example 1 and following the procedure for obtaining the hot melt combination as described in Example 13. The hot melt combination powder was then used to obtain a molding powder from the following formulation:

| Formulation ingredients | Amount (grams) |
|---|---|
| Hot melt combination | 35.00 |
| Mold release agent: Ross Wax 141 | 0.50 |
| Pigment: Carbon black | 0.40 |
| Fillers: | |
| 1/32" chopped glass fiber | 5.00 |
| Powdered silica | 58.85 |
| Catalyst: Imidazole | 0.25 |
| Total | 100.00 |

The molding powder from the above formulation was obtained in the same manner as in Example 12 and it exhibited good hot strength, release and appearance, cured within 2.0 minutes at 350° F., and also had the following properties:

Gel time (at 320° F.) _____seconds__ 50
Spiral flow (at 300° F.) _____inches__ 53.5
Spiral flow (at 350° F.) _____inches__ 45

EXAMPLE 18

The silicone-epoxy resin copolymer of Example 4 was again utilized to obtain a molding powder from the following formulation:

Formulation ingredients: Amount (grams)
Silicone-epoxy copolymer of Example 4 ____ 32.30
Curing agent:
  methylene bis resorcinol (methylene bis-2,4 hydroxy benzene) _____ 2.70
Mold release agent:
  Ross wax _____ 0.50
Pigment:
  Carbon black _____ 0.40
Fillers:
  1/32" chopped fiber glass _____ 5.00
  Powdered silica _____ 58.90
Catalyst:
  Imidazole _____ 0.20

100.00

The molding powder from the above formulation was obtained in the same manner as in Example 12 and it exhibited fair hot strength, good release and appearance, cured in 2.0 to 2.5 minutes at 350° F., and also had the following properties:

Gel time (at 320° F.) _____seconds__ 58
Spiral flow (at 300° F.) _____inches__ 42
Spiral flow (at 350° F.) _____inches__ 44

EXAMPLE 18A

The same procedure as in Example 15A was followed to obtain a molding powder utilizing the epoxy resin of Example 4 (DER 661) unmodified by the silicone for comparative purposes.

EXAMPLE 19

Employing the silicone-epoxy resin copolymer of Example 2, a molding powder was obtained from the following formulation:

Formulation Ingredients: Amount (grams)
Silicone-epoxy resin copolymer of Example 2 _____ 28.20
Curing agent:
  Benzophene dianhydride _____ 5.80
Mold release agents:
  Chemetron wax _____ 1.50
  Montan lignite wax _____ 0.30
Pigment:
  Carbon black _____ 0.40
Fillers:
  1/8" chopped glass fiber _____ 3.00
  Powdered silica _____ 59.55
Catalyst:
  (Same as Example 12) _____ 1.25

100.00

The molding powder from the above formulation was obtained in the same manner as in Example 12 and it exhibited fair hot strength, good release and appearance, cured in 2.5 minutes at 300° F., and also had the following properties:

Gel time (at 320° F.) _____seconds__ 31
Spiral flow (at 300° F.) _____inches__ 44

EXAMPLE 20

The silicone-epoxy resin copolymer of Example 4 was utilized as about half the total epoxy resin content to obtain a molding powder from the following formulation, the remaining epoxy resins being identified as indicated below:

Formulation ingredients: Amount (grams)
Silicone - epoxy resin copolymer of Example 4 _____ 15.12
Epoxy resins:
  Epoxy novolac (available under Shell Chemical Co. Trademark "Epon–154" having an m.p. of about 70°–80° F. and an E.E.W. of about 176) _____ 5.62
  Tetrafunctional Epoxy Resin (available under Union Carbide Co. Trademark "ERRA–0153" having an E.E.W. of about 200 and an S.P. of about 77° C.) _____ 7.85
Curing agents:
  Tetrachlorophthalic anhydride _____ 17.51
Mold release agent:
  Montan Lignite Wax _____ 0.30
Pigment:
  Carbon black _____ 0.40
Fillers:
  Powdered silica _____ 52.15
Catalysts:
  Tetrachlorophthalic anhydride salt of tri(dimethyl amino methyl) phenol __ 0.75
  Tetrachlorophthalic anhydride salt of 2-methyl imidazole _____ 0.30

100.00

The molding powder from the above formulation was obtained in the same manner as in Example 12 and it exhibited fair hot strength, good release and appearance, cured in 1.5 minutes at 300° F., and also had the following properties:

Gel time (at 320° F. _____seconds__ 26
Spiral flow (at 300° F.) _____inches__ 36

EXAMPLE 21

The silicone-epoxy resin copolymer of Example 7 was utilized to obtain a molding powder from the following formulations:

| Formulation ingredients: | Amount (grams) |
|---|---|
| Silicone - epoxy resin copolymer of Example 7 | 24.95 |
| Curing Agent: | |
| Phenolic Novolac (m.p. 90.95° C.) | 5.05 |
| Mold Release Agent: | |
| Ross Wax 141 | 0.50 |
| Pigment: | |
| Carbon Black | 0.40 |
| Fillers: | |
| 1/32" chopped glass fiber | 5.00 |
| Powdered silica | 63.00 |
| Catalyst: | |
| 2-hepta-decyl imidazole | 1.10 |
| | 100.00 |

The molding powder from the above formulation was obtained in the same manner as in Example 12 and it exhibited good hot strength, release, and appearance, cured in 1.5 minutes at 350° F., was demoldable in 2 minutes at 350° F., and also had the following properties:

Gel time (at 320° F.) _____seconds__ 35
Spiral flow (at 350° F.) _____inches__ 36

EXAMPLE 22

For comparative purposes, two molding powders were prepared, one of which utilized a silicone-epoxy copolymer of the invention while the other contained an epoxy resin without silicone. The molding powder formulation containing the silicone-epoxy resin copolymer of the invention is identified below as "22A" while the other molding powder without silicone is identified below as "22B." The silicone-epoxy resin copolymer in formulation 22A was obtained in the same manner as in Example 1 above except that 5 mols of the epoxy resin were combined with 1 mol of the silicone to provide a product having an S.P. (Durran's) of about 48° to 50° C. and an E.E.W. of 630, the silicone content in the copolymer being 24.3% by weight. The two molding powders had the following formulation and it will be noted that they are at 100% stoichiometry, higher than is typically provided in anhydride formulations.

| Formulation ingredients | Amount (grams) in formulation | |
|---|---|---|
| | 22A | 22B |
| Silicone-epoxy resin copolymer of Example 1 (modified as above) | 27.00 | |
| Epoxy resin (average E.E.W. 550–700; S.P. (Durran's, 75°–85° C | | 26.80 |
| Curing agent: BPDA | 7.00 | 7.20 |
| Mold release agent: | | |
| Chemetron Wax 100 | 1.50 | 1.50 |
| Montan Lignite Wax | 0.30 | 0.30 |
| Pigment: Carbon black | 0.40 | 0.40 |
| Filler: Powdered silica | 62.55 | 62.55 |
| Catalyst: (Same as in Example 12) | 1.25 | 1.25 |
| Total | 100.00 | 100.00 |

Molding powders were obtained from the above formulations in the same manner as in Example 12 and were found to have the following properties:

| Property | Molding powder | |
|---|---|---|
| | 22A | 22B |
| Cure | 2.0 minutes at 350° F. | 1.5 minutes at 350° F. |
| Release at 350° F | Good | Fair. |
| Hot strength at 350° F | do | Do. |
| Gel time (at 320° F.) | 27 seconds | 37 seconds. |
| Spiral flow (at 300° F.) | 46 inches | 51 inches. |

EXAMPLE 23

The silicone-epoxy resin copolymer of Example 8 was used to obtain a molding powder from the following formulations:

| Formulation ingredients | Amount (grams) |
|---|---|
| Silicone-epoxy resin copolymer of Example 8 | 28.50 |
| Curing agent: BPDA | 5.50 |
| Mold release agents: | |
| Chemetron Wax 100 | 1.50 |
| Montan Lignite Wax | 0.30 |
| Pigment: carbon black | 0.40 |
| Filler: powdered silica | 62.55 |
| Catalyst: (same as in Example 13) | 1.25 |
| Total | 100.00 |

Following the procedure of Example 12, a molding powder was obtained from the above formulation and it exhibited good hot strength, release and appearance after being cured for 3.0 minutes at 350° F., and also had the following properties:

Gel Time (at 320° F.) _____seconds__ 32
Spiral Flow (at 300° F.) _____inches__ 36

EXAMPLE 24

Utilizing the silicone-epoxy resin copolymer of Example 9, a molding powder was obtained from the formulation below. In this formulation, the curing agent employed was the product formed by the condensation of 2 mols of trimellitic anhydride, described in U.S. Pat. 3,547,582 to Payne et al. and having the structure:

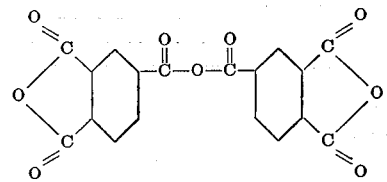

| Formulation ingredients: | Amount (grams) |
|---|---|
| Silicone - epoxy resin copolymer of Example 9 | 29.45 |
| Curing agent: | |
| Trimellitic anhydride (as described and identified above) | 4.55 |
| Mold release agents: | |
| Chemetron wax 100 | 1.50 |
| Montan lignite wax | 0.30 |
| Pigment: | |
| Carbon black | 0.40 |
| Filler: | |
| Powdered silica | 62.55 |
| Catalyst: | |
| (Same as in Example 12) | 1.25 |
| | 100.00 |

A molding powder was obtained from the above formulation following the procedure in Example 12 and it was found to exhibit good hot strength, release and appearance, cured in 2.0 minutes at 350° F., and also had the following properties:

Gel time (at 320° F.) _____seconds__ 24
Spiral flow (at 300° F.) _____inches__ 33

EXAMPLE 25

The silicone-epoxy resin copolymer of Example 10 was employed to obtain a molding powder from the formulation given below wherein the curing agent used was tetraphenylolethane (TPE) having the structure:

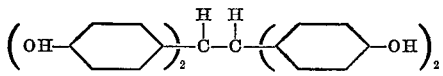

| Formulation ingredients: | Amount (grams) |
|---|---|
| Silicone-epoxy resin copolymer of Example 10 | 25.85 |
| Curing agent: | |
|   TPE (as described and identified above) | 4.16 |
| Mold release agent: | |
|   Ross Wax 141 | 0.50 |
| Pigment: | |
|   Carbon black | 0.40 |
| Fillers: | |
|   1/32″ chopped glass fiber | 5.00 |
|   Powdered Silica | 63.90 |
| Catalyst: | |
|   Imidazole | 0.20 |
| | 100.00 |

From the above formulation, a molding powder was obtained following the procedure of Example 12 and it exhibited good release, hot strength and appearance, cured in 2.0 minutes at 350° F. and also had the following properties:

Gel time (at 320° F.) _____seconds__ 28
Spiral flow (at 300° F.) _____inches__ 20

EXAMPLE 26

The silicone-epoxy resin copolymer of Example 11 was utilized to obtain a molding powder from the following formulation:

| Formulation ingredients: | Amount (grams) |
|---|---|
| Silicone-epoxy resin copolymer of Example 11 | 27.40 |
| Curing Agent: | |
|   Methylene diresorcinol | 2.60 |
| Mold Release agent: | |
|   Ross Wax 141 | 0.50 |
| Pigment: | |
|   Carbon black | 0.40 |
| Fillers: | |
|   1/16″ chopped glass fiber | 5.00 |
|   Powdered Silica | 63.00 |
| Catalyst: | |
|   Heptadecyl imidazole | 1.10 |
| | 100.00 |

The above formulation was employed to obtain a molding powder according to the procedure of Example 12 and it exhibited good release, hot strength and appearance, cured in 2.0 minutes at 350° F., and also had the following properties:

Gel time (at 320° F.) _____seconds__ 37
Spiral flow (at 300° F.) _____inches__ 38

EXAMPLE 27

The molding powders obtained in accordance with Examples 11-26 above were utilized to prepare molded discs which were then pressure cooked in water at 15 p.s.i. for prolonged periods to determine their moisture absorption and the change in their volume resistivity, volume resistivity being determined according to ASTM D–257. The test discs, obtained from conventional molding techniques, measured about 3.0 inches in diameter and had a thickness of about 1/8 inch. All discs were molded at 350° F. for a period of 5.0 minutes and then post cured at 175° C. for a period of two hours prior to being pressure cooked. The volume resistivity and moisture absorption of these discs are tabulated below wherein the numerical designation of the discs corresponds to the respective Example number above from which the molding powder was used to prepare the disc.

TABLE I.—VOLUME RESISTIVITY AND MOISTURE ABSORPTION OF MOLDED DISCS

| Disc | Period of pressure cooking (hours) | Volume resistivity Initial | Volume resistivity End | Moisture absorbed at end of pressure cooking (percent) |
|---|---|---|---|---|
| 12 | 130 | $2.16 \times 10^{16}$ | $2.80 \times 10^{14}$ | 0.91 |
| 13 | 145 | $1.94 \times 10^{16}$ | $3.4 \times 10^{14}$ | 0.95 |
| 14 | 135 | $4.44 \times 10^{16}$ | $6.76 \times 10^{14}$ | 0.63 |
| 15 | 140 | $8.1 \times 10^{16}$ | $9.45 \times 10^{14}$ | 1.31 |
| 15A | 140 | $1.1 \times 10^{17}$ | $2.6 \times 10^{14}$ | 2.91 |
| 16 | 140 | $2.4 \times 10^{16}$ | $4.27 \times 10^{14}$ | 0.98 |
| 17 | 140 | $3.0 \times 10^{16}$ | $3.06 \times 10^{14}$ | 0.88 |
| 18 | 165 | $2.07 \times 10^{16}$ | $3.61 \times 10^{14}$ | 0.99 |
| 18A | 165 | $7.7 \times 10^{16}$ | $1.99 \times 10^{13}$ | 1.85 |
| 19 | 165 | $2.66 \times 10^{16}$ | $1.96 \times 10^{14}$ | 1.16 |
| 20 | 165 | $8.14 \times 10^{15}$ | $1.1 \times 10^{15}$ | 0.80 |
| 21 | 126 | $2.03 \times 10^{16}$ | $8.10 \times 10^{14}$ | 0.93 |
| 22A | 20 | | | 0.91 |
|  | 40 | | | 1.11 |
|  | 60 | | | 1.27 |
|  | 145 | | | 1.99 |
| 22B | 20 | | | 2.20 |
|  | 40 | | | 3.49 |
|  | 60 | | | 4.63 |
|  | 145 | | | |
|  | 145 | | | |
| 23 | 148 | $8.7 \times 10^{15}$ | $4.0 \times 10^{14}$ | 1.13 |
| 24 | 148 | $1.8 \times 10^{16}$ | $2.1 \times 10^{15}$ | 1.12 |
| 25 | 148 | $1.8 \times 10^{16}$ | $1.7 \times 10^{14}$ | 0.88 |
| 26 | 145 | $2.05 \times 10^{16}$ | $8.75 \times 10^{14}$ | 0.85 |

As can be seen from the results set forth in Table 1 above, volume resistivity retention was very good and moisture absorption was reduced in every instance, and good comparisons between molding powders containing unmodified epoxy resins with those containing the silicone-epoxy copolymer of the invention are demonstrated in the comparative results obtained for discs 15 and 15A, 18 and 18A, and 22A and 22B above. It should be noted that no moisture absorption results are shown for disc 22B at 145 hours of pressure cooking since these discs became rubbery after 60 hours pressure cooking and could not be processed further.

The comparative results shown for discs 22A and 22B are of further significance when it is considered that the anhydride curing agent was used at 100% stoichiometry since it is known that an anhydride used at this stoichiometric level results in providing a significant number of uncombined acid groups in the cured product. These uncombined acid groups are strongly hydrophilic resulting in relatively high water absorption in products containing them. Although some degree of acidity in the cured product may be desirable, a high water absorption level is not. Disc 22A reveals that even cured products containing uncombined acid groups have significantly reduced water absorption rates when the product includes the silicone-epoxy resin copolymer of the invention.

The results in Table 1 above are of further significance when it is realized that alkoxy functional silanes are well known for use in improving the water resistance of epoxy resin molding compositions. The water resistance is greatly improved when the compositions contain amine curing agents but only slightly improved when the compositions contain anhydride curing agents. Hence, although the silicone-epoxy resin copolymer of the invention improves the water resistance of epoxy resin molding powders containing amine curing agents, the dramatic and significant improvement of water resistance in those powders containing the silicone-epoxy resin copolymer of the invention and anhydride curing agents is surprising and unexpected.

EXAMPLE 28

For comparative purposes, attempts were made to prepare a silicone-epoxy resin copolymer following the teachings disclosed by the prior art, particularly that of Tyler in U.S. Pat. 3,170,962. Accordingly, 3200 g. (2 mols) of the same silicone intermediate employed in Example 1 and 3200 g. (3.2 mols) of the same epoxy resin utilized in Example 1 were combined to obtain the silicone-epoxy resin copolymer of this Example. It will be noted that equal amounts of the silicone and epoxy resin were employed on a weight basis which corresponds to 1.6 mols of epoxy resin per mol of silicone intermediate.

The same procedure as in Example 2 was followed to prepare this copolymer and, at the outset, the reactions appeared to be completely normal; that is, the reaction containing the initial aliquot of silicone as well as the reaction following the addition of the second aliquot of silicone appeared to proceed as described in Example 2. Following the addition of the last aliquot of silicone, however, small, solid particles were observed to be suspended throughout the solution charge giving it a somewhat grainy appearance and this grainy appearance became more pronounced as the toluene was distilled off.

At the end of the reaction period, the resultant product was poured into a tray and allowed to cool and solidify whereupon there was obtained a white, opaque solid. This product appeared to be fairly uniform in cross-section but its upper surface was rough and uneven and had a grainy texture which indicated at least some of an incompatible second phase.

A sample of this product was then subjected to the 150° C. heat cycle test. At the end of the first hour of heating, the product melted and flowed out but had the same grainy appearance. After being permitted to cool and solidify, the product was broken up into several pieces and these pieces were subjected to the second heating step. During this heating, the product melted only slightly and at the end of the heating period, a second phase was evident as large, infusible lumps in the melted fraction. Hence, this product failed the 150° C. heat cycle test.

Following the procedure of Example 12, a molding powder was prepared from this product and molded discs were obtained as described in Example 27. The discs obtained had a splotchy, unattractive appearance.

From the standpoint of performance when subjected to the 150° C. heat cycle test as well as the standpoint of appearance, the product of this Example is considered to be unsatisfactory.

EXAMPLE 29

The electrical insulating properties of molding powders utilizing the silicone-epoxy resin copolymer of the invention were also determined. In one test, dummy integrated circuit (IC) frames were encapsulated with a molding composition of the invention while in another test, live transistors were encapsulated and then subjected to the "High Temperature Reverse Bias Test," hereinafter designated as the HTRB test. In each test, the molding composition of Example 21 was employed as being exemplary of the molding powders hereinabove described which contain the silicone-epoxy copolymer of the invention.

Although IC frames can be of various design, they typically contain a plurality of leads, generally 14 or more, which are positioned so that the inner ends of the leads terminate at or near the center of the IC frame where a semi-conductor chip is placed. Since most IC frames are stamped out of conductive metal, those of a given design are identical. Identical IC frames encapsulated with the above-identified molding composition were pressure cooked for a period of 126 hours at 15 p.s.i. and the current leakage between two, adjacent leads was measured before and after being subjected to the pressure cooking test. As a result, it was found that leakage current of the IC frames increased from $7.5 \times 10^{-14}$ amperes to $3.9 \times 10^{-13}$ amperes.

The HTRB test involves stressing the encapsulated electronic device by subjecting it to an applied voltage equal to about one-half its operating voltage but in the opposite direction to the normal operation of the device and at an elevated temperature. This test determines the change in operating characteristics after stressing the device and involves about a 40 volt reverse bias at 185° C. for a period in excess of 17 hours. The results are determined according to the equation:

$$\beta = \frac{\Delta Ic}{\Delta Ib}$$

where $\Delta Ic$ is the change of collector current caused by the change of base current, $\Delta Ib$, with the value obtained expressed as "Beta" ($\beta$).

A further test simulates accelerated aging in use by subjecting the encapsulated device to pressure cooking for a prolonged period and then determining its $\beta$ value from the HTRB test.

Several encapsulated transistors were subjected to the above described tests and the results obtained are tabulated below. Leakage current was also determined at various intervals for each of the encapsulated devices and these are also included in the following tabulation:

TABLE II
[HTRB test (185° C., 40 volts)]

| Device number | $\beta$ Value | | | Leakage current (amps) | | |
|---|---|---|---|---|---|---|
| | Initial | 19 hrs. | 38 hrs. | Initial | 19 hrs. | 38 hrs. |
| 1 | 150 | 150 | 140 | $10^{-11}$ | $10^{-11}$ | $10^{-11}$ |
| 2 | 125 | 130 | 120 | $10^{-11}$ | $10^{-11}$ | $10^{-11}$ |
| 3 | 100 | 110 | 110 | $10^{-11}$ | $10^{-11}$ | $10^{-11}$ |
| 4 | 150 | 155 | 130 | $10^{-11}$ | $10^{-11}$ | $10^{-11}$ |
| 5 | 120 | 135 | 120 | $10^{-11}$ | $10^{-11}$ | $10^{-11}$ |

After pressure cooking for 47 hrs. at 15 p.s.i.

| Device number | Initial | Final | Initial | Final |
|---|---|---|---|---|
| 6 | 140 | 110 | $10^{-11}$ | $10^{-11}$ |
| 7 | 110 | 100 | $10^{-11}$ | $10^{-10}$ |
| 8 | 42 | 39 | $10^{-11}$ | $10^{-11}$ |
| 9 | 75 | 60 | $10^{-12}$ | $10^{-10}$ |
| 10 | 100 | 90 | $10^{-11}$ | $10^{-10}$ |

These results indicate that the encapsulated devices were almost perfectly protected. The absolute value for $\beta$ are not as important as the stability of the $\beta$ values in each instance. A change in $\beta$ value of more than about 30% in either direction is generally considered to be a failure of the protected device. In the above tabulation, it can be seen that the greatest $\beta$ value change is about 20% in devices 6 and 9.

Furthermore, a device is generally considered to be useless when its leakage current is above about $10^{-8}$ or $10^{-7}$ amperes. The results in Table II above reveal useful devices in every instance with leakage currents well below the considered failure value.

What is claimed is:

1. A solid, homogeneous silicone-epoxy resin copolymer, said copolymer consisting essentially of a hydroxy terminated poly-functional methyl phenyl silicone intermediate, and an epoxy resin having at least one hydroxyl group and a molecular weight of about 624 to 2000, the amount of said silicone intermediate being within the range of 15 to 40% by weight of said copolymer, and the proportions of said epoxy resin and silicone intermediate being such that the epoxy resin supplies at least the same number of epoxy hydroxyl groups as there are hydroxyl groups, reactive at 120° C., present in said silicone intermediate.

2. The copolymer of claim 1 wherein said silicone intermediate is an hydroxy terminated, tetrafunctional silicone having an average molecular weight of about 1400 to 1600.

3. The copolymer of claim 1 wherein said epoxy resin is a bisphenol A resin.

4. The copolymer of claim 1 wherein said epoxy resin is a cycloaliphatic resin.

5. The copolymer of claim 1 wherein said epoxy resin has a molecular weight of about 700 to 2000 and the molar ratio of epoxy resin to silicone intermediate is about 4.0:1 to 5.5:1.

6. The copolymer of claim 1 wherein said epoxy resin has a molecular weight of about 800 to 1200, the molar ratio of said epoxy resin to said silicone intermediate is about 4.25:1 to 4.75:1, and the weight percent of said silicone intermediate is about 25% to 35%.

7. A solid, heat curable epoxy molding powder containing epoxy resin component and other components selected from the group consisting of curing agents, mold release agents, pigments, fillers, and catalysts, appropriate for the intended use of said molding powder, about 50% to 100% by weight of said epoxy resin component being a solid, powdered, homogeneous silicone-epoxy resin copolymer, said copolymer consisting essentially of a hydroxy terminated poly-functional, methyl phenyl silicone intermediate present in said copolymer in an amount of about 15% to 40% by weight, and an epoxy resin having at least one hydroxyl group and having a molecular weight of about 624 to 2000, and the proportions of said epoxy resin and silicone intermediate being such that the epoxy resin supplies at least the same number of epoxy hydroxyl groups as there are hydroxyl groups, reactive at 120° C., present in said silicone intermediate.

8. The molding powder of claim 7 wherein said silicone intermediate is a hydroxy terminated, tetrafunctional silicone having an average molecular weight of about 1400 to 1600.

9. The molding powder of claim 7 wherein said epoxy resin is a bisphenol A resin.

10. The molding powder of claim 7 wherein said epoxy resin is a cycloaliphatic resin.

11. The molding powder of claim 7 wherein said epoxy resin has a molecular weight of about 700 to 2000 and the molar ratio of epoxy resin to silicone intermediate is about 4.0:1 to 5.5:1.

12. The molding powder of claim 7 wherein said epoxy resin has a molecular weight of about 800 to 1200, the molar ratio of said epoxy resin to said silicone intermediate is about 4.25:1 to 4.75:1, and the weight percent of said silicone intermediate present in said copolymer is about 25% to 35%.

13. The molding powder of claim 7 wherein said molding powder includes a phenolic curing agent in an amount of about 2.5 to 20.0% by weight.

14. The molding powder of claim 7 wherein said molding powder includes an anhydride curing agent in an amount of about 2.5 to 20.0% by weight.

15. A method for preparing a solid, homogeneous silicone-epoxy resin copolymer comprising dissolving a portion of an hydroxy terminated poly-functional, methyl phenyl silicone intermediate having a molecular weight of about 1400 to 1600 with an epoxy resin having at least one hydroxyl group and a molecular weight of about 624 to 2000 in a solvent, said silicone intermediate being present in an amount no greater than that sufficient to react, at a temperature of about 120° C., with the hydroxyls supplied by said epoxy resin; heating the charge at a temperature of about 120° C. to condense said silicone intermediate and said epoxy resin and to azeotrope off water resulting from said condensation; distilling off said solvent; and permitting said copolymer to cool and solidify.

16. The method of claim 15 wherein said silicone intermediate is an hydroxy terminated, tetrafunctional silicone.

17. The method of claim 15 wherein the full amount of epoxy resin is initially dissolved in said solvent, and the said silicone intermediate is dissolved with said epoxy resin in a plurality of steps wherein aliquot amounts of the silicone intermediate are dissolved with said epoxy resin during each step, and water formed in each step is azeotroped off before the next addition of silicone intermediate, to thereby maintain an excess of epoxy resin at all times during the formation of said copolymer.

References Cited

UNITED STATES PATENTS

| | | | |
|---|---|---|---|
| 3,170,962 | 2/1965 | Tyler | 260—824 EP |
| 3,317,443 | 5/1967 | Brady | 260—824 EP |
| 2,819,245 | 1/1958 | Shorr | 260—824 EP |
| 3,154,597 | 10/1964 | McWhirter | 260—824 EP |

WILBERT J. BRIGGS, SR., Primary Examiner

U.S. Cl. X.R.

260—28, 37 SB, EP, 38, 826, 830 R, TW, 832, 838